(12) United States Patent
Perez

(10) Patent No.: US 11,051,633 B1
(45) Date of Patent: Jul. 6, 2021

(54) VEHICLE MOUNTED BABY CHANGING TABLE

(71) Applicant: Eddy M. Perez, Polk City, FL (US)

(72) Inventor: Eddy M. Perez, Polk City, FL (US)

( * ) Notice: Subject to any disclaimer, the term of this patent is extended or adjusted under 35 U.S.C. 154(b) by 0 days.

(21) Appl. No.: 16/661,516

(22) Filed: Oct. 23, 2019

(51) Int. Cl.
*A47D 5/00* (2006.01)
*B60N 3/00* (2006.01)

(52) U.S. Cl.
CPC ............. *A47D 5/006* (2013.01); *B60N 3/001* (2013.01)

(58) Field of Classification Search
CPC ............. A47D 5/006; A47D 5/00; B60N 3/00
See application file for complete search history.

(56) References Cited

U.S. PATENT DOCUMENTS

| 9,120,398 | B2 | 9/2015 | Iskowitz | |
| 2006/0150324 | A1* | 7/2006 | Jackson | B60R 11/00 5/118 |
| 2014/0259394 | A1* | 9/2014 | Iskowitz | B60N 3/004 5/118 |
| 2017/0303701 | A1* | 10/2017 | Degon | A47D 5/003 |
| 2018/0008054 | A1* | 1/2018 | Vargas Garcia | B60N 3/004 |

* cited by examiner

*Primary Examiner* — Fredrick C Conley
(74) *Attorney, Agent, or Firm* — Sanchelima & Associates, P.A.; Christian Sanchelima; Alexander Rodriguez

(57) ABSTRACT

A vehicle mounted baby changing table including a changing table assembly, a vehicle assembly, a vehicle attachment and a table support assembly is disclosed. The vehicle mounted baby changing table further includes a changing table comprising a rectangular structure formed of a vertical back panel having a hingedly attached front panel, wherein the back panel is mountable to the rear side of vehicle seats. Such that the front panel folds down to a horizontal table surface that projects rearward within the vehicle back seat or cargo area.

13 Claims, 4 Drawing Sheets

VEHICLE MOUNTED BABY CHANGING TABLE

BACKGROUND OF THE INVENTION

1. Field of the Invention

The present invention relates to a baby changing table and, more particularly, to a vehicle mounted baby changing table.

2. Description of the Related Art

Several designs for baby changing tables have been designed in the past. None of them, however, include a changing table comprising a rectangular structure formed of a vertical back panel having a hindgedly attached front panel, wherein the back panel is mounted to the rear side of vehicle seats. Such that the front panel folds down to a horizontal table surface that projects rearward within the vehicle back seat or cargo area.

Applicant believes that a related reference corresponds to U.S. Pat. No. 9,120,398 for a portable baby changing station fabricated to mount onto the back side of a vehicle seats and to fold down for use. Another related reference corresponds to U.S. Patent Application No. 2018/0008054 for an integrated changing table assembly that pivots out from a vehicle seat-back to provide a table surface. None of these references, however, teach of a changing table formed of a vertical back panel that includes a hingedly attached front panel, wherein the back panel is mountable to a rear side of vehicle seats.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a baby changing table that allows users to change a baby's diapers on the go.

It is another object of this invention to provide a baby changing table that can be retrofitted onto vehicles.

It is still another object of the present invention to provide a baby changing table that can be folded when not in use to make the cargo space of a vehicle available.

It is yet another object of this invention to provide such a baby changing table that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
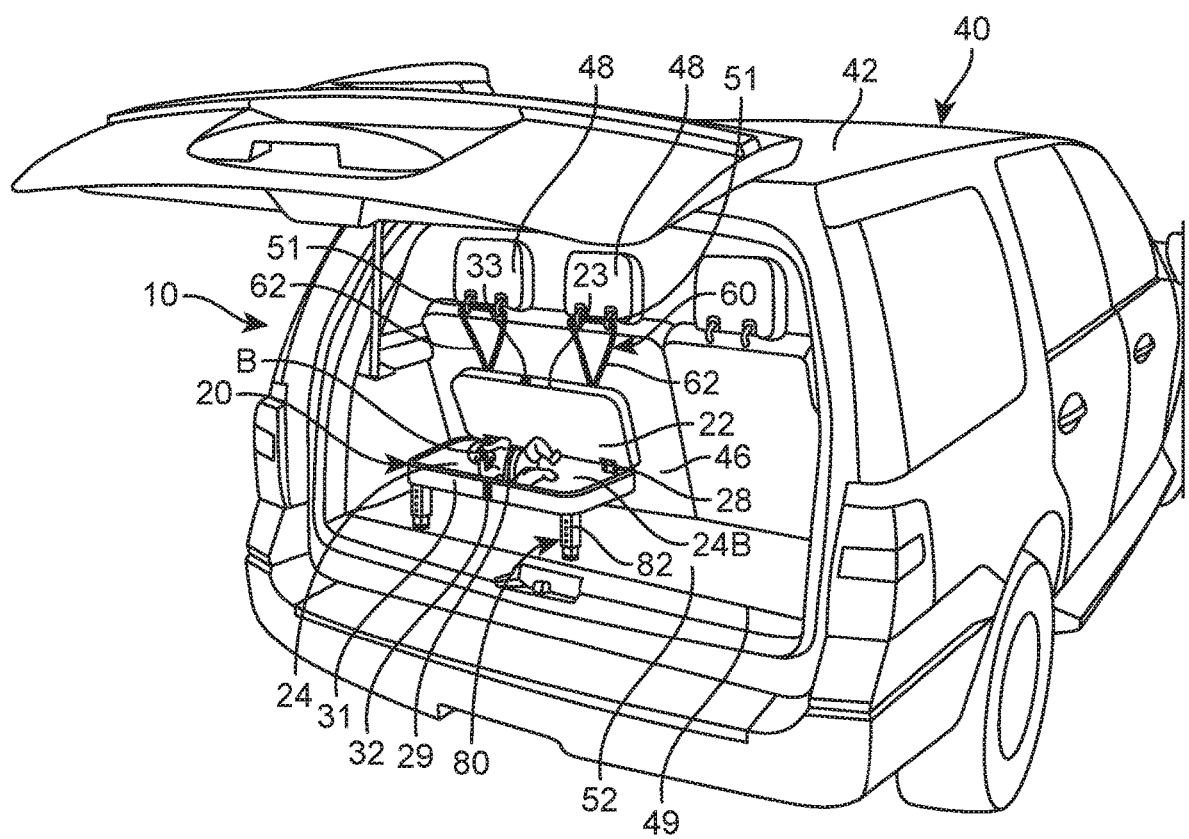
FIG. 1 represents an isometric view of the present invention in an operating environment mounted to a car seat.
Figure 2:
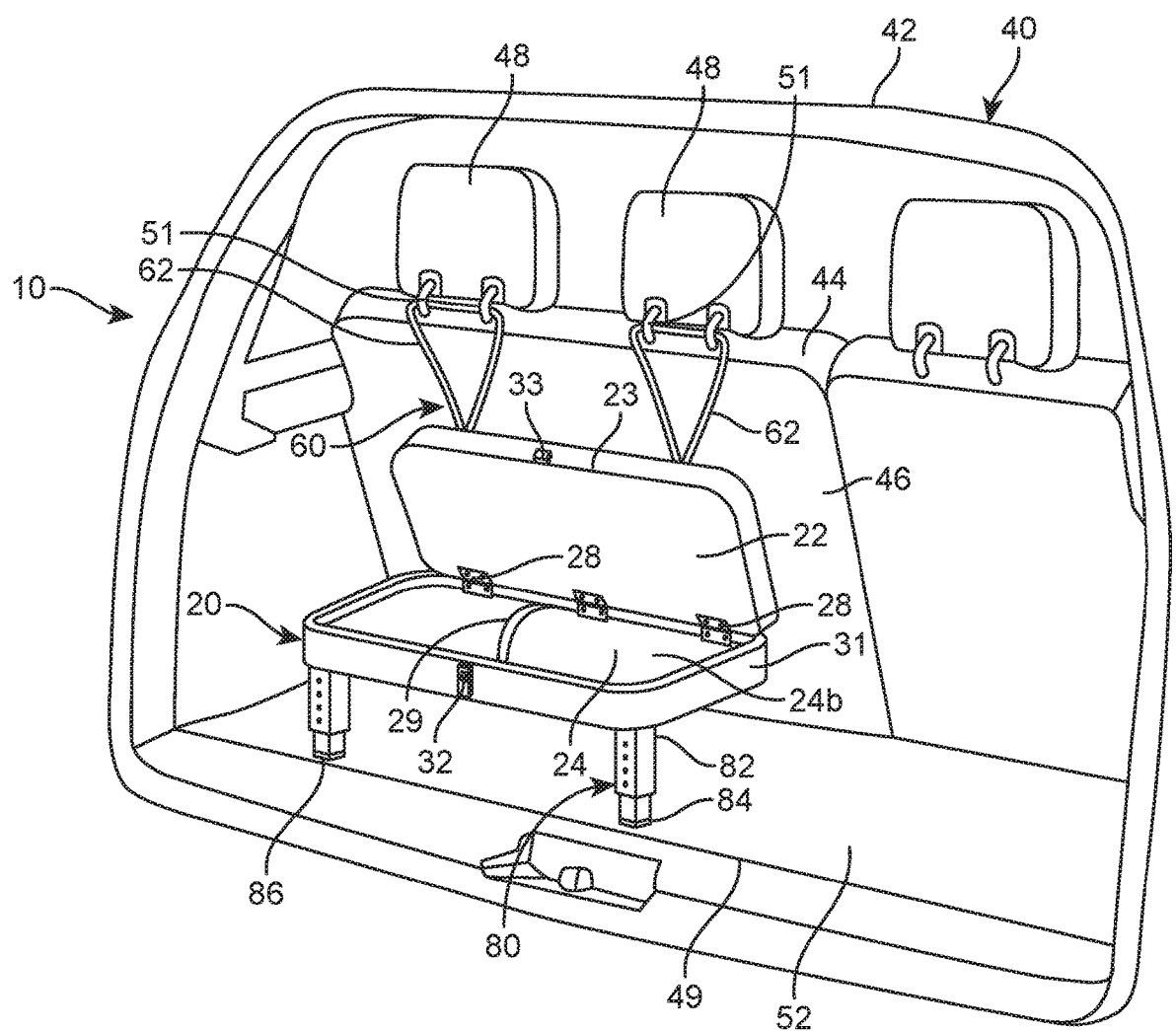
FIG. 2 shows an isometric view of the present invention in an open configuration.
Figure 3:
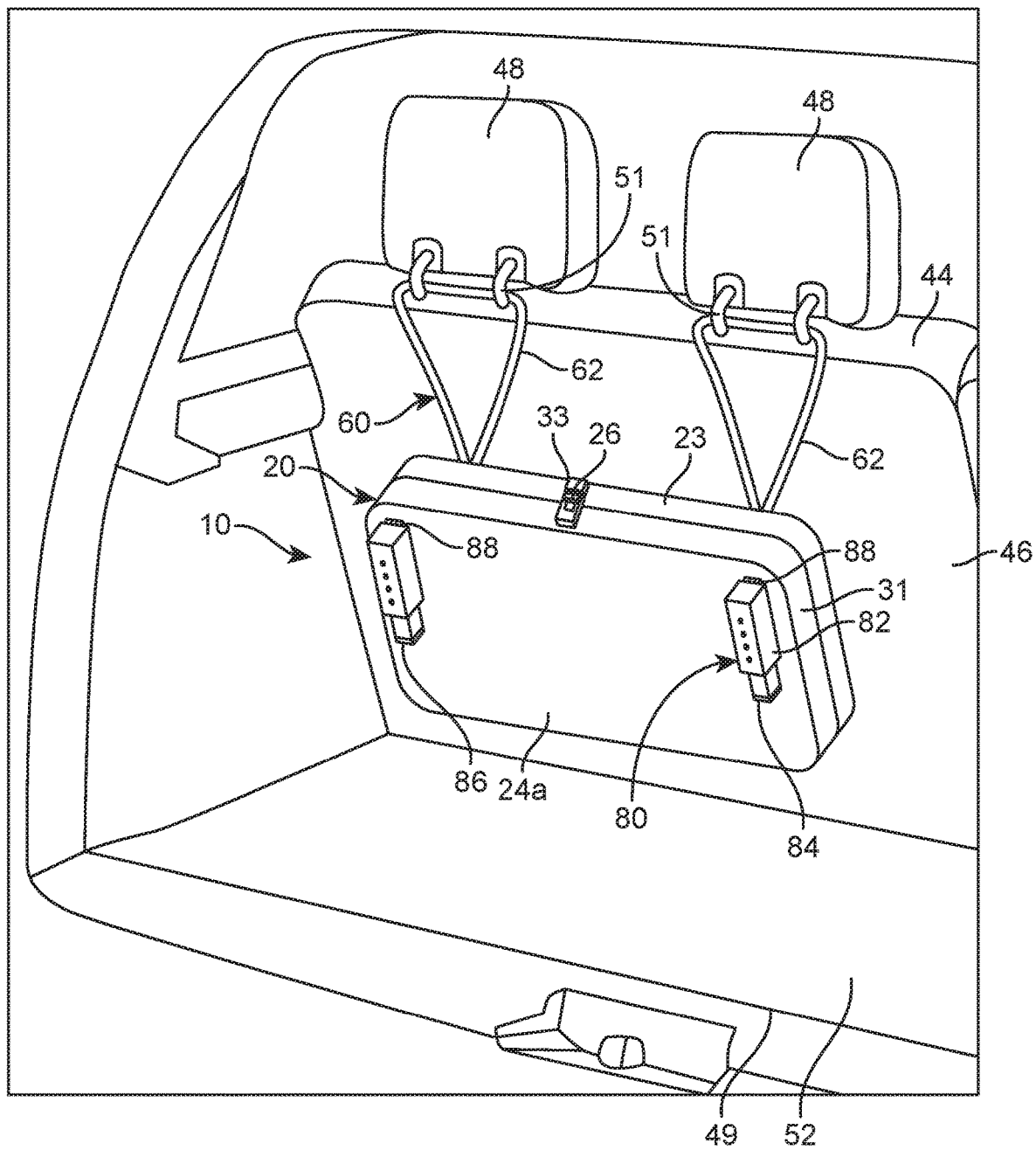
FIG. 3 illustrates an isometric view of the present invention in a closed configuration.
Figure 4:
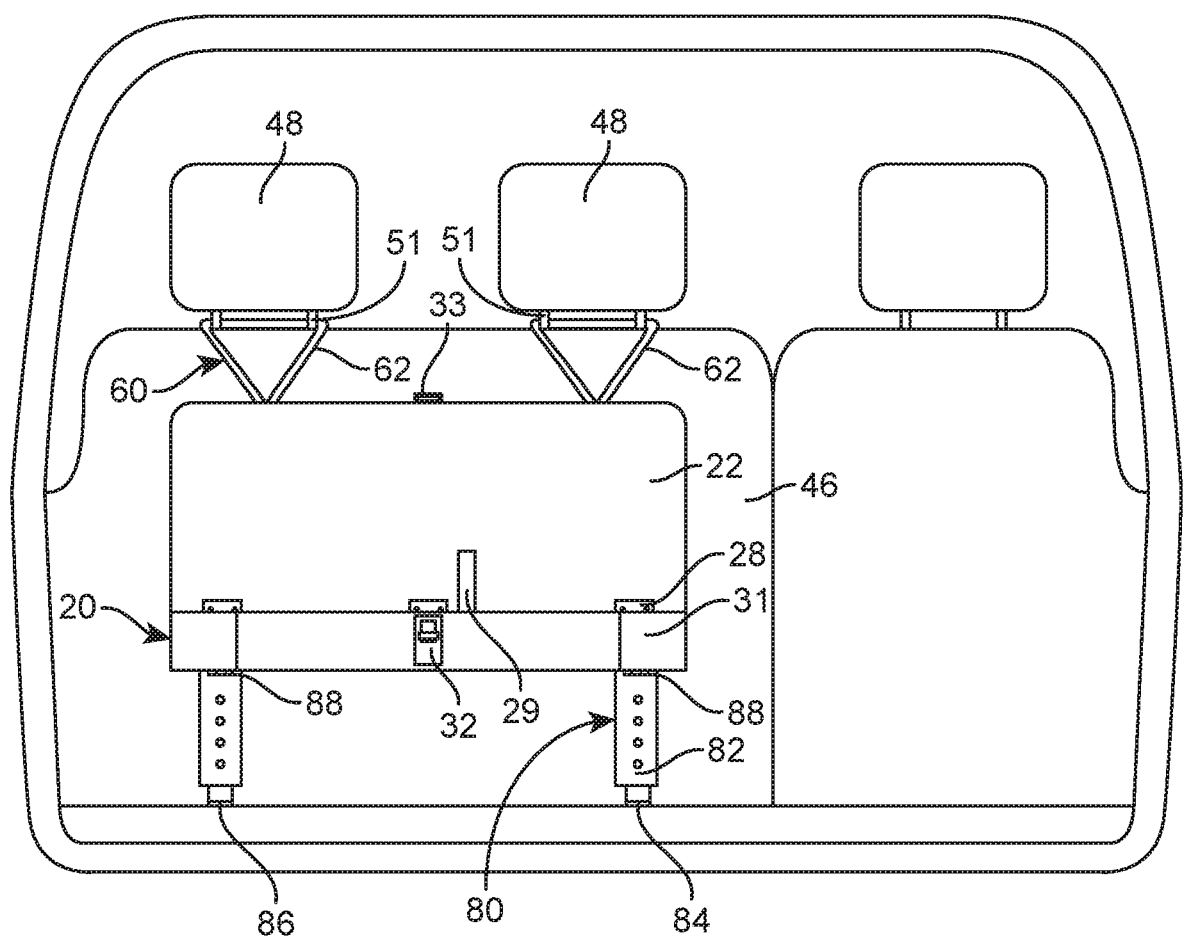
FIG. 4 is a front view of the present invention mounted within a vehicle.

Referring now to the drawings, where the present invention is generally referred to with numeral 10, it can be observed that it, a vehicle mounted baby changing table 10, basically includes a table assembly 20, a vehicle assembly 40, a vehicle attachment assembly 60 and a support assembly 80.

Changing table assembly 20 in one embodiment has a substantially rectangular configuration and can include a vertical back panel 22 and a front panel 24. Front panel 24 may preferably be concave and bowl shaped on a top surface 24b thereof. The shape of front panel 24 helps to increase the safety of a child C being held thereon as front panel 24 may include sidewalls 31 that aid in maintaining child C within the peripheral boundaries or perimeter of front panel 24. In one embodiment vertical back panel 22 can be hingedly mounted to front panel 24 at substantially a 90-degree angle. Other angles can be used to achieve a similar result. Vertical back panel 22 can be mounted to vehicle assembly 40. Vehicle assembly 40 may include a vehicle 42 having a vehicle seat 44. Vehicle seat 44 may include a vehicle seat rear side 46 and headrests 48. Vertical back panel 22 may be mounted to vehicle seat 44 at vehicle seat rear side 46. In one embodiment, vehicle 42 can be a sedan. It is understood that other vehicles such as sport utility vehicles, mini vans, pick-up trucks and the like can be used with the present invention as vehicle 42. The present invention can be positioned in an open configuration and a closed configuration. In the closed configuration front panel 24 is hingedly raised towards vertical back panel 22 with the use of hinges 28 and can be placed in a flush or almost flush relationship. Locking member 26 can be used in combination with hinges 28 to hold front panel 24 in a raised and closed configuration. Locking member 26 may include a male member 32 and a female member 33. Male member 32 may engage female member 33 in order to secure vertical front panel 22 to front panel 24 in the closed configuration. Female member 33 may be mounted onto vertical back panel 22 and male member 32 may be mounted onto front panel 24 or vice versa may be suitable as well.

In the open configuration, front panel 24 is lowered using hinges 28 and by releasing locking member 26 so that front panel 24 is parallel or substantially parallel with a ground surface such as a floor of a cargo space 49 of vehicle 42 and is compatible to safely rest a baby, infant or child thereon to change his or her diapers or otherwise take care of them. In the open configuration, front panel 24 is opened towards the rear of vehicle 42 and within cargo space 49. It is understood that more than one present invention can be mounted to additional seats within vehicle 42. In one embodiment, changing table assembly 20 can include restraining members 29 to secure the child to the present invention. Restraining members 29 can be a seat belt-like device extending along the width of front panel 24 at a predetermined location. Each of restraining members 29 may include a male head and a female head to engage one another to secure each of restraining members 29 to one another.

Table support assembly 80 includes support members 82. In one embodiment, support members 82 are telescopic to able to be set to different lengths as needed. A top portion of support members 82 may include a plurality of holes for setting the lower portion of support members 82 to different heights or lengths therewith. A push button on the lower portion of support members 82 may engage one of the plurality of holes for the desired height or length to be achieved. In one embodiment, support members 82 can be legs or feet that are mounted to front panel 24. Front panel 24 includes a bottom surface 24a that has support members 82 mounted thereon and can be retracted flush and parallel against bottom surface 24a in a closed position. Support members 82 can also be hingedly lowered in an open position so they are perpendicular to or substantially perpendicular to bottom surface 24a and are prepared to come into abutting engagement with a ground surface or otherwise flat surface that can support the weight of the present invention and any child placed thereon. In one embodiment, support members 82 include distal ends 84 that can include gripping members 86. Support members 82 can be mounted to bottom surface 24a using hinged members 88.

Further, the present invention can include vehicle attachment assembly 60 mounted to a top end 23 of vertical back panel 22. More specifically, vehicle attachment assembly 60 may include at least one mounting member 62 mounted to top end 23 of vertical back panel 22. At least one mounting member 62 may be a rope, a string, a tether or the like as known in the art. At least one mounting member 62 may be of a predetermined shape and dimension. At least one mounting member 62 may preferably be in the shape of a loop as to be able to be mounted around a base 51 of headrests 48. At least one mounting member 62 engages base 51 to secure the present invention adjacently to vehicle sear rear side 46. At least one mounting member 62 may correspond with the number of headrests 48 that the present invention is to be mounted to. It should be understood that at least one mounting member 62 may be adjustable in length as to allow for proper fitting onto vehicles in which the present invention is retrofitted thereto. A user U may need the present invention to be mounted higher or lower in vehicle 42 in order for support members 82 to be able to properly reach vehicle floor 52.

In an operational setting, the present invention works as follows. Firstly, the present invention may be retrofitted onto any existing vehicle 42, more specifically, to vehicle seat rear side 46 of a vehicle seat 44. Vertical back panel 22 may be secured adjacent to vehicle seat rear side 46 with the usage of at least one mounting member 62 that engage headrests 48 located mounted atop of vehicle seat rear side 46. Now the present invention includes an open and a closed configuration. The present invention may preferably be retro fitted onto vehicle 42 in the closed configuration. Once the present invention is mounted to vehicle 42 the hindgedly mounted front panel 24 may be lowered to achieve the open configuration. In the open configuration, support members 82 may be released and extended from bottom surface 24a of front panel 24 until a ground surface is reached in order to provide additional support and stability to front panel 24 in the open configuration. Once in the open configuration, child C may be placed on top of front panel 24 and secured in place with retraining members 29 for changing of diapers or other necessary tasks needed to be accomplished.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a vehicle mounted changing table, comprising:
    a) a changing table assembly including a vertical back panel and a front panel, said front panel having a top surface and a bottom surface, said vertical back panel including a top end, said vertical back panel and said front panel mounted to one another with hinges, said hinges permit said front panel to be raised to achieve a closed configuration of said changing table assembly and said hinges also permit said front panel to be lowered parallel to a ground surface to achieve an open configuration of said changing table assembly, said front panel having sidewalls extending from said top surface, wherein said top surface is concave and bowl shaped resulting in an inner portion of the top surface to be recessed within the front panel, wherein an inner surface of said vertical back panel is entirely flat, said changing table assembly is held in the closed configuration with a locking member mounted thereon said vertical back panel and said front panel;
    b) a vehicle assembly including a vehicle having a vehicle seat therein, said vehicle seat having a vehicle seat rear side and headrests mounted to said vehicle seat, said headrests each having a base extending therefrom said vehicle seat, wherein said base is a set of two curved structural members that extend from a rear side of said headrests and engage with a top end of said vehicle seat rear side, said vehicle further including a cargo space and a vehicle floor, said changing table being mounted to said vehicle seat rear side and within said cargo space;
    c) a vehicle attachment assembly having at least one mounting member, said at least one mounting member being mounted to said top end of said vertical back panel, said at least one mounted member secured to said headrests at said base thereof, wherein said at least one mounting member is a loop member that passes through the two curved structural members of said base, said at least one mounting member being located entirely behind a rear portion of said vehicle seat; and
    d) a table support assembly mounted to said bottom surface of said front panel, said table support assembly having independent support members being spaced apart and each with a distal end, said independent support members mounted to said bottom surface with hinged members, said hinged members allow said independent support members to extend and retract, said independent support members in abutting contact with said vehicle floor when said independent support members are extended.

2. The system of claim 1, wherein said front panel includes restraining members to secure a child thereto said front panel.

3. The system of claim 1, wherein said independent support members include gripping members at said distal end for added stability to said independent support members when making contact with said vehicle floor.

4. The system of claim 1, wherein said locking member includes a male member and a female member.

5. The system of claim 4, wherein said male member is mounted to said front panel and said female member is mounted to said vertical back panel or vice versa, said male member engages said female member to secure said vertical back panel and said front panel together in the closed configuration.

6. The system of claim 1, wherein the vehicle attachment assembly allows for said changing table assembly to be retrofitted to said vehicle.

7. The system of claim 1, wherein said vertical back panel and said front panel are of a same width and length.

8. The system of claim 1, wherein said supporting members are perpendicular to said front panel when said front panel is in the open configuration and said supporting members are extended.

9. The system of claim 1, wherein said supporting members are parallel to each other when said supporting members are extended or retracted together.

10. The system of claim 1, wherein said vertical back panel and said front panel are flush with one another in the closed configuration.

11. The system of claim 1, wherein said hinges are mounted to one of said sidewalls of said front panel and to a front surface of said vertical back panel.

12. The system of claim 1, wherein said independent support members are telescopic to be able to be set to different lengths.

13. A system for a vehicle mounted changing table, consisting of:
 a) a changing table assembly including a vertical back panel and a front panel, said front panel having a top surface and a bottom surface, said vertical back panel including a top end, said vertical back panel and said front panel mounted to one another with three hinges, wherein said three hinges permit said front panel to be raised to achieve a closed configuration of said changing table assembly and said three hinges also permit said front panel to be lowered parallel to a ground surface to achieve an open configuration of said changing table assembly, said front panel having sidewalls extending from said top surface, wherein said three hinges are coupled to an inner portion of said sidewalls and an inner surface of said vertical back panel, wherein said top surface is concave and bowl shaped resulting in an inner portion of the top surface to be recessed within the front panel, wherein said inner surface of said vertical back panel is entirely flat, said changing table assembly is held in the closed configuration with a locking member mounted thereon said vertical back panel and said front panel, wherein said locking member includes a female member and a male member, wherein said male member is located on a front edge of the vertical back panel and said female member is located at a front edge of said front panel;
 b) a vehicle assembly including a vehicle having a vehicle seat therein, said vehicle seat having a vehicle seat rear side and headrests mounted to said vehicle seat, said headrests each having a base extending therefrom said vehicle seat, wherein said base is a set of two curved structural members that extend from a rear side of said headrests and engage with a top end of said vehicle seat rear side, said vehicle further including a cargo space and a vehicle floor, said changing table being mounted to said vehicle seat rear side and within said cargo space;
 c) a vehicle attachment assembly having at least one mounting member, said at least one mounting member being mounted to said top end of said vertical back panel, said at least one mounted member secured to said headrests at said base thereof, wherein said at least one mounting member is a loop member that passes through the two curved structural members of said base, said at least one mounting member being located entirely behind a rear portion of said vehicle seat; and
 d) a table support assembly mounted to said bottom surface of said front panel, said table support assembly having two independent support members being spaced apart and each with a distal end, said two independent support members mounted to said bottom surface with hinged members, said hinged members allow said two independent support members to extend and retract, said two independent support members in abutting contact with said vehicle floor when said two independent support members are extended, wherein said two independent support members each include a first support portion and a second support portion, wherein said first support portion is hingedly mounted to said bottom surface, said first support portion also including a plurality of openings on a front face, wherein said second support portion is nested within said first support portion and is telescopically adjustable.

\* \* \* \* \*